March 17, 1959  J. R. ARTHUR  2,878,342
MAGNETIC CHIP DETECTOR
Filed March 21, 1955
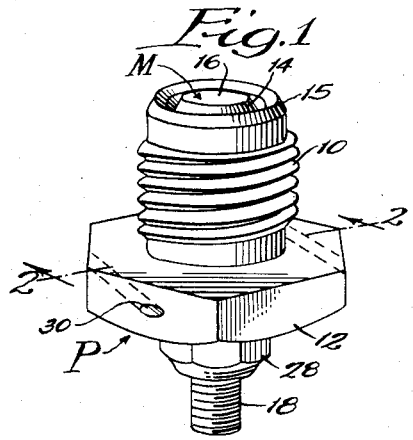
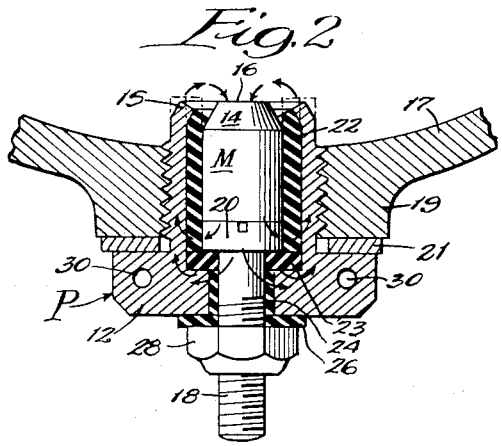
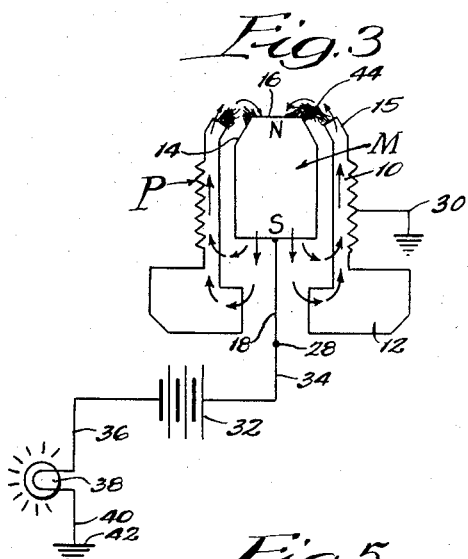
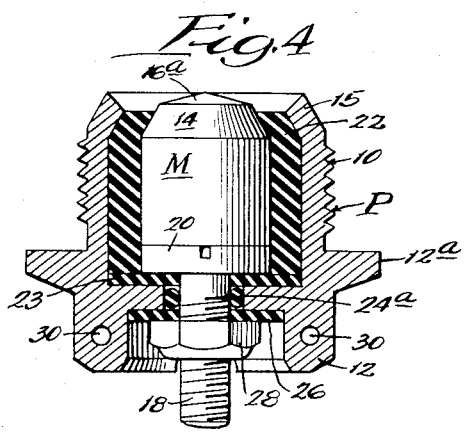
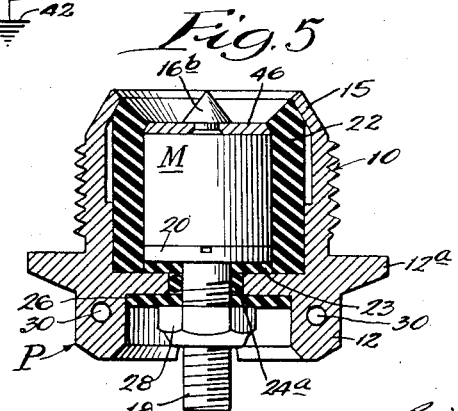
INVENTOR:
John R. Arthur,
BY Bair, Freeman & Molinare
ATTORNEYS.

United States Patent Office 2,878,342
Patented Mar. 17, 1959

2,878,342

MAGNETIC CHIP DETECTOR

John R. Arthur, Clarinda, Iowa, assignor to Lisle Corporation, Clarinda, Iowa, a corporation of Iowa Application March 21, 1955, Serial No. 495,387

5 Claims. (Cl. 200—61.09)

This invention relates to a magnetic chip detector of the general character shown in my assignee's Van Os Patent No. 2,252,222, the present invention relating to practical embodiments of the magnetic chip detector shown generally in the Van Os patent.

One object of the invention is to provide a detector for metal particles in the form of a plug that may be screwed into a gear casing or the like and which includes a magnet for attracting ferrous particles from oil or the like in the gear case to thus insure a more readily established indicator circuit than possible with the non-magnetized arrangement of the Van Os patent.

Another object is to provide a construction that provides an economical and rugged mounting for a bar magnet with respect to the plug, provision being made for insulating the one from the other so that the plug body and the magnet may form opposite poles of a circuit closer for a signal light or the like.

A further object is to provide a relationship between the plug body and magnet such that the plug body furnishes part of the magnetic path so that a concentrated ring of magnetic flux may be provided for maximum attracting effect on any ferrous particles that are in the oil and come anywhere near the plug so as to be drawn theretoward, thus removing such particles from the oil at the earliest opportunity, which results in lengthening the life of the gears and other working parts in the gear housing.

Still a further object is to provide a magnetic detector plug capable of providing a signal circuit upon ferrous particles bridging a relatively narrow ring of insulation at any point around the circumference thereof so as to indicate by such bridging and the consequent establishment of a signal circuit that the plug requires cleaning, the plug thereby serving to warn the operator, if the accumulation of particles on the plug is excessive, that a breakdown of mechanical parts, such as gears in a transmission, may be impending.

An additional object is to provide a modified form of construction wherein a deflecting element is provided centrally of the end of a magnet so as to more effectively deflect particles approaching the magnet to a position for bridging the circle of insulation and thereby establishing the signal circuit.

With these and other objects in view, my invention consists in the construction, arrangement and combination of the various parts thereof, whereby the objects contemplated are attained, as hereinafter more fully set forth, pointed out in my claims and illustrated in detail on the accompanying drawing, wherein:

Fig. 1 is a perspective view of a magnetic chip detector embodying my present invention.

Fig. 2 is a vertical sectional view thereof on the line 2—2 of Fig 1.

Fig. 3 is a diagrammatic view of Fig. 2, showing only the magnet and the shell, and including an electric diagram of an indicator circuit that can be used in connection with my disclosed detector.

Fig. 4 is a sectional view of a modified form of detector.

Fig. 5 is a vertical sectional view of another modified form thereof, and Fig. 6 is a perspective view of one of the elements in Fig. 5.

On the accompanying drawing I have used the reference character P to indicate a plug, and M a magnet. The plug P comprises a threaded portion 10 adapted to be screwed into a boss 19 of a gear casing 17 or the like and a head 12 of suitable shape for engagement by a wrench or the like.

The magnet M is preferably cylindrical in shape with a truncated cone-shaped part 14 which may terminate in a flat end 16, or this end may be somewhat pointed as at 16a in Fig. 4, if desired. For economy in manufacture, the magnet is preferably of the bar type. A terminal screw 18 is provided, having a head 20. It is adapted to make electrical contact with the bottom surface of the magnet M.

The magnet and the terminal screw are mounted in the plug P in such manner as to be insulated therefrom. To accomplish this, I provide the following insulating members: a sleeve 22, a washer 23, a sleeve 24 and a washer 26. These members are mounted as illustrated in Fig. 2, the upper end of the plug portion 10 and of the sleeve 22, being initially in the upright position shown by dotted lines, and the plug spun over as at 15, after a nut 28 is tightened against the washer 26, and the magnet inserted in the sleeve 22. Spinning over the upper edge at 15 as shown by solid lines contracts the upper end of the sleeve 22 against the cone-shaped part 14 of the magnet, thus holding it against dislocation and forcing it due to the incline of the cone-shaped surface toward the head 20 of the terminal screw 18 to tightly engage it and insure good electrical connection between the two. However, it is possible to retain the magnet satisfactorily by means of portions of the plug overhanging the magnet without having the cone-shaped end referred to.

Referring to Fig. 3, the plug P is grounded as indicated at 30, by being screwed into the gear housing 17. An electrical circuit is provided by a wire 34 connected to the terminal screw 18, and wires 36 and 40 connected with a battery or other source of current 32 and a light bulb or the like 38 for signalling purposes interposed in the circuit. Accordingly, when ferrous particles 44 collect to such an extent that they bridge the upper end of the plug and magnet as shown at the right side of Fig. 3, a circuit is established for lighting the light 38 as illustrated. In this way the operator is apprised of the fact that there has been sufficient accumulation of particles to require cleaning of the plug. The insulating sleeve 22 may be thicker if a greater accumulation is desired or thinner for less accumulation.

The magnetic flux path is illustrated in Figs. 2 and 3 by arrows. The path is from the lower end of the magnet to the plug so that its upper end serves as an annular pole surrounding the upper end of the magnet. This upper end serves as the other pole, the gap between the poles thereby being circular in shape. There is thus a concentrated magnetic field of annular form and the concentration can be increased if desired by reducing the thickness of the insulating elements.

For all practical purposes then, the magnetic path is substantially as shown by the arrows in Fig. 3, and is confined at the upper end of the detector by the upper end of the sleeve 22.

In Fig. 4 the wrench-engageable portion 12 of the plug P has a flange 12a to engage the usual gasket 21 shown in Fig. 2 and an O-ring 24a is substituted for the sleeve 24. In Fig. 2 the members 23 and 26 serve as gaskets to prevent leakage, whereas in Fig. 4 the O-ring 24a serves this purpose. Also in Fig. 4, the flat end of the magnet has been replaced by a cone-shaped end 16a of small altitude. This shape contributes somewhat to the directing of the particles 44 of Fig. 3 to a bridging formation.

In Fig. 5 I provide a cone-shaped metal element 16b riveted to a washer 46 of steel or the like, and the washer is retained in position by the spun-over end 15 of the plug body and the upper end of the insulating sleeve 22 which bends over the upper edge of the magnet M for holding it in position. This figure also shows modifications in the proportions of the various parts.

From the foregoing description it will be obvious that I have provided a chip detector of the magnetic plug type, which is comparatively inexpensive to manufacture, and is so designed as to effectively retain the magnet in position against dislodgement, yet provide an annular gap in the magnetic path wherein a concentrated magnetic field is formed for attracting ferrous particles from oil or the like passing by the plug. When the accumulation reaches the bridging point at any location circumferentially of the plug, the signal 38 is energized for indicating purposes.

Some changes may be made in the construction and arrangement of the parts of my magnetic chip detector without departing from the real spirit and purpose of my invention. It is therefore my intention to cover by my claims any modified forms of structure or use of mechanical equivalents which may reasonably be included within their scope.

I claim as my invention:

1. In a magnetic chip detector, a tubular plug which is electrically conductive, a permanent magnet located therein and spaced therefrom, insulating material in the space between the two, a terminal screw in said plug and insulated therefrom, said screw having a head within said plug, one pole end of said magnet contacting said head, said magnet having an upwardly facing upper end, said plug having downwardly facing portions associated therewith to retain said insulating material and thereby said magnet in said plug and in contact with said terminal screw head, the other pole end of said magnet and the adjacent end of said plug constituting opposed magnetic poles to attract ferrous particles which may bridge said insulating material.

2. In a magnetic chip detector, a tubular plug of electrically conducting material having a screw-threaded body and a head, a permanent magnet located therein and spaced therefrom, insulating material in the space between the two, a terminal screw in said plug and insulated therefrom, said screw having a head within said plug, one pole end of said magnet contacting the upper end of said head, means on said plug to retain said magnet in said plug, the upper ends of said plug and said magnet being spaced apart by said insulating material and thereby forming a gap to be bridged by electrically conductive particles.

3. In a magnetic chip detector, a tubular plug of electrically conducting material having a screw threaded body and a head, a permanent magnet located therein and spaced therefrom, insulating material in the space between the two, a terminal screw in said plug and insulated therefrom, said magnet contacting the upper end thereof, means on said plug to retain said magnet in said plug and in contact with said terminal screw, and a cap member on said magnet having a pointed element substantially centered relative to the annular upper end of said plug.

4. In a magnetic chip detector, a tubular plug which is electrically conductive, a permanent bar magnet located therein and spaced therefrom, insulating material in the space between the two, a terminal screw in said plug and insulated therefrom, said magnet contacting the upper end thereof and having an upwardly facing portion, said plug having an inturned upper edge associated with said upwardly facing portion to retain said magnet in said plug and in contact with said upper end of said terminal screw.

5. In a device of the character disclosed, a tubular plug of electrically conducting material having a screw threaded body and a head, a permanent bar magnet located in said body and spaced therefrom, insulating material in the space between said magnet and said body, a terminal screw in said body and insulated therefrom, one pole end of said magnet contacting the upper end thereof and the other pole thereof being a truncated cone, said body having an inturned upper edge associated with said truncated cone to retain said magnet in contact with said terminal screw.

References Cited in the file of this patent

UNITED STATES PATENTS

| | | |
|---|---|---|
| 2,429,920 | Bourne | Oct. 28, 1947 |
| 2,450,630 | Bourne | Oct. 5, 1948 |
| 2,462,715 | Booth | Feb. 22, 1949 |
| 2,556,390 | Harrison | June 12, 1951 |
| 2,754,380 | Meile | July 10, 1956 |